United States Patent [19]

Hart

[11] Patent Number: 4,635,242

[45] Date of Patent: Jan. 6, 1987

[54] UNDERWATER SIGNALLING DEVICE

[76] Inventor: James E. Hart, P.O. Box 8857, Metairie, La. 70011

[21] Appl. No.: 632,937

[22] Filed: Jul. 20, 1984

[51] Int. Cl.[4] .............................................. H04B 11/00

[52] U.S. Cl. .................................... 367/134; 367/137; 367/910

[58] Field of Search ................ 367/132, 134, 910, 137

[56] References Cited

U.S. PATENT DOCUMENTS

| | | | |
|---|---|---|---|
| 3,267,414 | 8/1966 | Kritz | 367/910 |
| 3,337,841 | 8/1967 | Wainwright et al. | 367/132 |
| 3,686,656 | 8/1972 | Richards | 367/134 |
| 3,786,406 | 1/1974 | Bianco | 367/134 |
| 3,986,161 | 10/1976 | Mackellar | 367/910 |
| 4,281,404 | 7/1981 | Morrow, Jr. et al. | 367/910 |

*Primary Examiner*—Richard A. Farley
*Attorney, Agent, or Firm*—George A. Bode

[57] ABSTRACT

A portable, self-contained underwater signalling device adapted to be worn by a diver. A waterproof housing has contained therein an acoustic sound generator, a power source and a three-position switch and circuit board connected in circuit between the power source and sound generator. The three-position switch provides an off or open position, a momentary on position and a full on position. The circuit board may vary the frequency of the signal output of the sound generator when the switch is in the constant on position to generate a pulsed frequency or a constant frequency.

17 Claims, 2 Drawing Figures

UNDERWATER SIGNALLING DEVICE

BACKGROUND OF THE INVENTION

1. Field of the Invention

The invention relates generally to an apparatus for generating an audible signal and more particularly, relates to an apparatus for generating an audible signal under water for communication between divers.

2. General Background

In the area of sport and commercial diving a variety of situations exist which require that divers have some form of communication with each other. A number of dangerous situations may arise whether diving in shallow or deep waters which may necessitate the need for signalling other divers to either warn of impending danger or signal that a diver is in need of help. This need for communication between divers also exists in non-emergency situation. Often times when diving, divers may be separated by a relatively short distance, but such distance is sufficient that hand signals may be insufficient to capture the attention of a fellow diver. In these situations, a diver may not always have tools or implements for making sufficient noise under water which will attract the attention of his fellow divers. It can be seen that a need exists for a relatively inexpensive device which would be available to all divers, which is water resistant, produces a sound to allow communication between divers and is sized small enough so that it is easily carried by a diver. Patents of which applicant is aware include the following.

U.S. Pat. No. 4,095,667 discloses a portable underwater signalling transducer for use by divers having self-contained underwater breathing apparatus (scuba) to signal to other divers as well as surface and underwater vessels. The device uses high pressure compressed air from the diver's tank to drive a hammer against a diaphragm to cause sound waves to be transmitted through the water. The device is mechanical whereas the present invention is electrical. Also, the device uses complex valving and would be prone to corrosion due to metallic construction, thus resulting in higher costs.

U.S. Pat. No. 4,312,054 discloses a device which provides a housing having a battery therein with one terminal which forms an abutment against a contact screw fixed in the housing. The second battery terminal abuts against a compression spring which holds the battery in place and provides contact with an end plug, which is removable and forms a seal against the internal walls of the housing by means of a gasket to prevent the entry of water into the housing. The opposite end of the housing is provided with a similar plug sealed by a gasket. The second plug is provided with a membrane and pressure switch. The pressure switch is activated by the membrane in response to water pressure to provide power through printed circuits provided in the housing to a transmitter which is mounted on the exterior surface of the housing. The transmitter is in communication with the printed circuits by a lead which is fed through the external wall of the housing. The device is attached to the hull of a ship and may be used to aid in locating the ship if it should sink.

U.S. Pat. No. 4,281,404 discloses a depth finding apparatus which comprises a hand held self-contained housing having a water immersible nose which carries a transducer adapted to transmit and receive sonic pulses. The housing includes transmitting and receiving circuitry having electrical connections with the transducer and located in a water tight interior. A switch is provided to operate a self-contained source of power for energizing the transmitting and receiving circuitry. The apparatus is not used for communication, but is used for determining water depth.

U.S. Pat. No. 3,469,231 discloses a device for underwater communication and location. A housing has contained therein a modulated ultrasonic frequency wave transmitter and receiver with several sonic frequency transducers. The transducers have spherical shape characteristics, but are provided with a point for locating a device. The device is also provided with a switch in the housing for alternate sending and receiving and for acoustic or optical indicating elements for receiving signals and for locating another of the same device. The device utilizes ultrasonic frequencies rather than acoustic sounding means as does the present invention and thus requires more complex electronics. This taken in combination with the fact that two of the devices are needed for them to work makes the device cost prohibitive to sport divers.

U.S. Pat. Nos. 4,297,677; 3,248,723; 3,558,822 and 3,728,670 all disclose battery powered noise generators which are portable, but do not discuss their adaptation for underwater use.

Unpatented devices of which applicant is aware include the "Sport-Phone Diver C.B." and "Wet-Beacon/Wet-Finder Electronic Navigation System." The "Sport-Phone" is a waterproof C.B. radio which may be used underwater and consists of a transceiver having the microphone attached to a regulator and a bone conduction earphone. The "Navigation System" sends out ultrasonic pulses to aid a diver in marking and relocating a specific location.

SUMMARY OF THE INVENTION

The present invention solves the aforementioned problems in a straight forward manner. What is provided is a portable underwater signalling device which can be easily carried by a diver and operated to call for help, warn other divers of a dangerous situation or otherwise communicate with other divers. A water and pressure resistant housing has a self-contained power source, a switch for activating the device, a circuit for controlling or modifying the signal and a sounding device for producing the audible signal in response to switch actuation by a diver.

In view of the above, it is an object of the invention to provide a portable underwater signalling device, which is completely self-contained and may be used to selectively generate an underwater noise for communicating with other divers.

It is a feature of the invention to provide a portable underwater signalling device having a switch which may be selectively positioned to provide a momentary or constant audible signal.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and, wherein.

DETAILED DESCRIPTION OF THE PREFERRED EMBODIMENT

Figure 2:
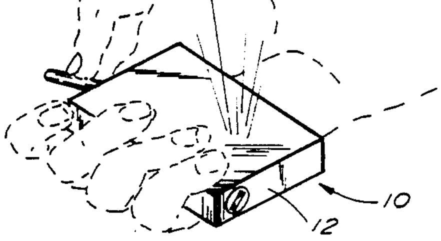
FIG. 2 is a view of the apparatus as it is hand held illustrating convenience of size and operation.

Referring now to the drawings, it can be seen that the apparatus is generally referred to by the numeral 10. Apparatus 10 is generally comprised of a housing 12 in a shape and size which can be secured to a diver's wrist, leg or equipment without limiting or inhibiting his movement and hand activated as illustrated in FIG. 2. Housing 12 contains therein power source 20, means 30 for generating sound and means 40 for selective activation of sound generating means 30.

In the preferred embodiment, housing 12 is constructed of a suitable plastic which may be formed by a conventional molding process and sealed to provide a water tight enclosure which is resistant to the pressures encountered during diving. As seen in the blow-up view of FIG. 1, housing 12 is provided with aperture 14 to provide access to the interior of housing 12 and power source 20 for replacement and checking thereof. Aperture 14 is threaded to receive cap 16. Cap 16 is also threaded to engage with aperture 14. Cap 16 is provided with longitudingal recess 17 on the outside thereof to provide a means of loosening and tightening cap 16 in aperture 14. O-ring 18 is provided and sized to fit between cap 16 and aperture 14 so as to form a watertight seal with the interior of housing 12 when cap 16 is threadably engaged in aperture 14. Cap 16 also serves to retain power source 20 in proper position within housing 12.

Power source 20 is generally comprised of batteries 22, battery cradle 24, spring contact 26 and contact 28 positioned on the interior of housing 12 adjacent aperture 14. In the preferred embodiment, batteries 22 are comprised of two - 1.5 volt size N batteries which are connected in series as illustrated. Batteries 22 are maintained in their proper position within housing 12 by battery cradle 24, spring contact 26 and cap 16. Spring contact 26 makes contact with one terminal of a battery 22 and also serves to bias battery 22 against cap 16 and contact 28 for completion of a circuit to supply electrical power to means 30 for generating sound and means 40 for activating sound generating means 30. Battery cradle 24 is of a general convex shape to receive batteries 22 and prevent batteries 22 from unnecessary movement within housing 12 while maintaining proper contact between batteries 22 and contacts 26 and 28.

Figure 1:
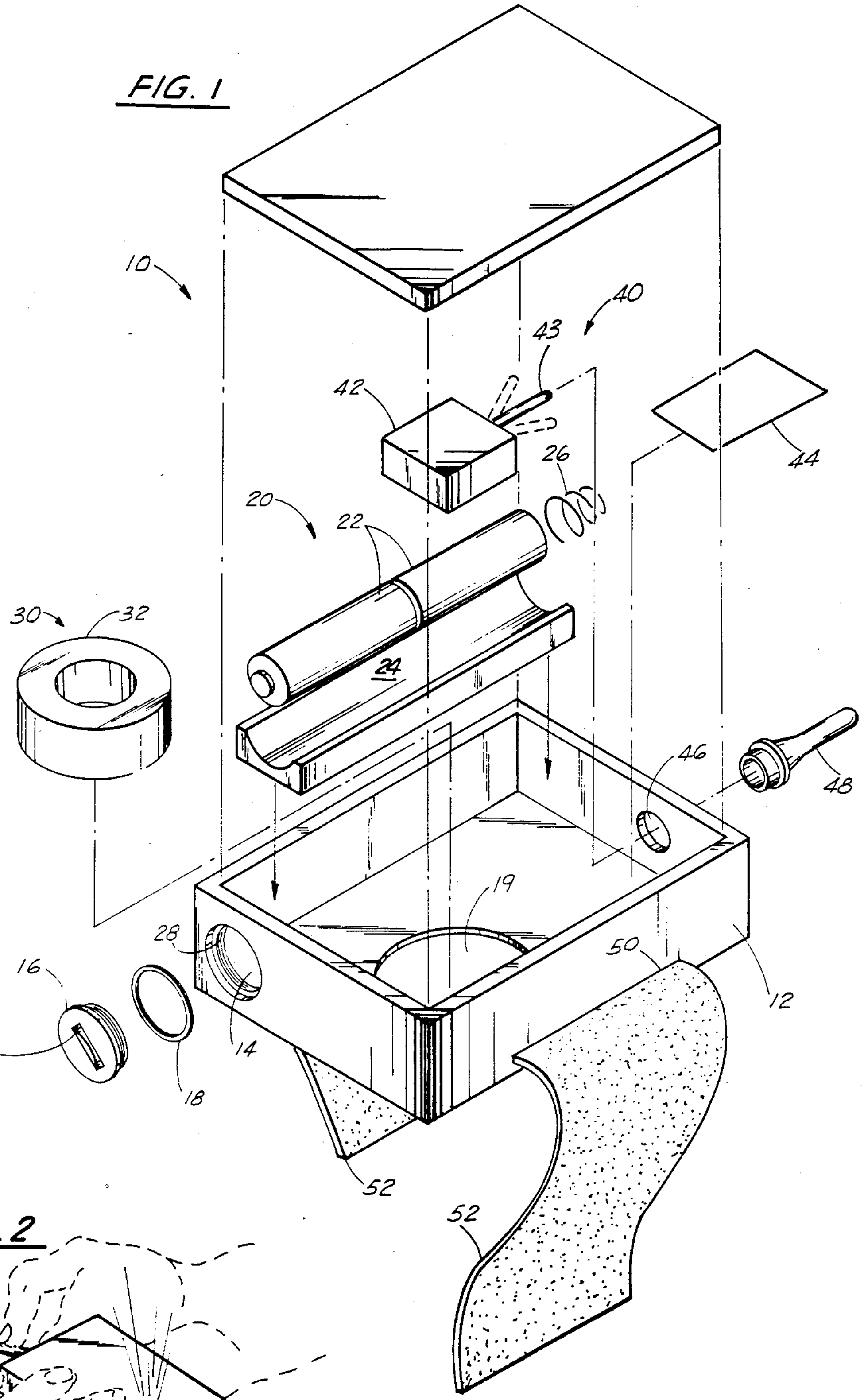
FIG. 1 is a blow-up of the apparatus.

Means 30 for generating sound is received in recess 19 within housing 12. This serves two purposes. First, means 30 for generating sound is prevented from unwanted movement within housing 12 and the thinner wall provided on housing 12 by recess 19 allows a greater distribution of sound generated by means 30 to be produced outside of apparatus 10. While recess 19 provides a thinner wall for allowing sound to escape from housing 19, it in no way reduces the structural rigidity required of housing 12 for withstanding the increased pressures encountered during diving conditions. Means 30 for generating sound may comprise a transducer, buzzer or speaker, but in the preferred embodiment, means 30 is comprised of a one inch buzzer 32 fit within recess 19 and facing recess 19 for the most efficient production of sound but means 30 may also be a speaker. Means 30 may be positioned against any of the walls of apparatus 10 and is not limited to the placement as illustrated in FIG. 1.

Means 40 for activating sound generating means 30 is connected in circuit between power source 20 and sound generating means 30. Means 40 is generally comprised of switch 42 and circuit board 44. In the preferred embodiment, switch 42 is a three position switch. When handle 43 on switch 42 is in its center position, no current is passed through switch 42 to circuit board 44 and sound generating means 30. In one of the side positions, as illustrated in phantom view, handle 43 is spring loaded and will return to its normally off position so that this side position may be used to act as a momentary on switch for generating a pulse to sound generating means 30. This mode of activating sound generating means 30 may be used to communicate between divers in a predetermined code for sending messages or warning or calling for help. In the opposite side position, switch 43 will remain in the on position and allow current from power source 22 to continually pass through switch 42 to circuit board 44, thus continually activating sound generating means 30. This position which causes continual sounding from apparatus 10 may be utilized as an emergency signal warning or calling for help mode.

Circuit board 44 may be wired between switch 42 and sound generating means 30 so as to cause sound generating means 30 to generate a pulsed or constant frequency when switch 42 is in the constant on position. Circuit board 44 may also be wired to cause sound generating means 30 to oscillate and provide a distinct constant or pulsing tone when switch 42 is in the constant on position in the event a speaker is used instead of a buzzer. The different tones and/or pulses could be used as a predetermined emergency signal between divers which would prevent confusion of normal communication requests as opposed to an emergency request signal.

Switch 42 is positioned within housing 12 such that handle 43 protrudes through aperture 46 provided in housing 12 to provide access to handle 43 by the user. Waterproof boot 48 is provided around handle 43 and in sealing engagement with housing 12 to prevent entry of water into housing 12. Boot 48 is preferably constructed of a flexible material, such as rubber which is able to withstand the pressures encountered during diving operations and the pressures created during activation of switch 43 without rupturing. The need for boot 42 may be eliminated by utilizing a waterproof model of switch 42 which may be suitably sealed with housing 12 at aperture 46.

Housing 12 is also provided with extending flanges 50 on the sides of apparatus 10. Flange 50 extends outwardly from housing 12 to provide a space for the attachment of a strap or the like, such as a velcro strap 52 so that the diver may attach apparatus 10 to a wrist, leg or piece of equipment where apparatus 10 is easily accessible, but will not interfere with the normal operations of the diver.

In operation, the diver attaches apparatus 10 to a convenient place, such as his wrist before entering the water. During the diving session, if an emergency arises or it is necessary to communicate with other divers, handle 43 may be moved to the "momentary on" position or "constant on" position, thus activating sound generating means 30 by completion of the circuit with power source 20, switch 42, circuit board 44 and sound generating means 30. Predetermined signals may be used in the "momentary on" position for transmitting messages or the switch may be positioned into the "constant on" position for generating a constant or pulsed signal which may be used to indicate an emergency at a minimum effective range of 100 to 150 feet.

Because many varying and different embodiments may be made within the scope of the inventive concept herein taught, and because many modifications may be made in the embodiments herein detailed in accordance with the descriptive requirment of the law, it is to be understood that the details herein are to be interpreted as illustrative and not in a limiting sense.

What is claimed as invention is:

1. An underwater signalling device, comprising:
a. a waterproof housing;
b. an acoustic signal means mounted in said housing;
c. a power source mounted in said housing;
d. a waterproof switch connected between said power source and said signal means for selective activation of said signal means, said switch including means for biasing said switch from a second to a first position thereof; and
e. circuit means connected between said switch and said signal means for varying the output of said signal means, said switch comprising a three-position switch movable between said first position opening said circuit for preventing emission of an audible signal from said signal means, said second position for providing a momentary closing of said circuit for providing a momentary pulsed audible signal from said signal means and a third position closing said circuit for providing a constant audible signal from said signal means.

2. The apparatus of claim 1, wherein said acoustic signal means comprises an acoustic sound generator.

3. The apparatus of claim 2 wherein said acoustic signal means comprises a buzzer.

4. The apparatus of claim 2 wherein said acoustic signal means comprises a speaker.

5. The apparatus of claim 1, wherein said power source comprises a dry cell battery.

6. The apparatus of claim 1, wherein said circuit means causes the output of said signal means to be generated at a pulsed frequency when said switch is in said third position.

7. An underwater signalling device, comprising:
a. a waterproof housing;
b. an acoustic sound generator mounted in said housing;
c. a power source mounted in said housing;
d. a waterproof switch connected between said power source and said sound generator for selective activation of said sound generator, said switch including means for biasing said switch from a second to a first position thereof; and
e. circuit means connected between said switch and said sound generator for varying the output of said sound generator, said switch comprising a three-position switch movable between said first position opening said circuit for preventing emission of an audible signal from said signal means, said second position for providing a momentary closing of said circuit for providing a momentary pulsed audible signal from said signal means and a third position closing said circuit for providing a constant audible signal from said signal means.

8. The apparatus of claim 7 wherein said acoustic sound generator comprises a buzzer.

9. The apparatus of claim 7 wherein said acoustic sound generator comprises a speaker.

10. The apparatus of claim 7, wherein said power source comprises a dry cell battery.

11. The apparatus of claim 7, wherein said circuit means causes the output of said acoustic sound generator to be generated at a pulsed frequency when said switch is in said third position.

12. The apparatus of claim 7 wherein said circuit means causes the output of said acoustic sound generator to be generated at a constant frequency when said switch is in said third position.

13. An underwater signalling device, comprising:
a. a waterproof housing;
b. an acoustic sound generator mounted in said housing;
c. a dry cell battery mounted in said housing;
d. a three-position waterproof switch mounted in said housing and having a handle protruding exterior of said housing, said handle movable between first, second and third positions, said switch including means for biasing said switch from said second to said first positions thereof;
e. circuit means connected between said switch and said acoustic sound generator for varying the output of said acoustic sound generator, said switch comprising a three-position switch movable between said first position opening said circuit for preventing emission of an audible signal from said signal means, said second position for providing a momentary closing of said circuit for providing a momentary pulsed audible signal from said signal means and a third position closing said circuit for providing a constant pulsed audible signal from said signal means; and
f. a waterproof switch boot mounted on the exterior of said housing around said handle.

14. The apparatus of claim 13, further comprising access means to said battery.

15. The apparatus of claim 13, wherein said housing is constructed of water and pressure resistant plastic.

16. The apparatus of claim 13 wherein said acoustic sound generator comprises a buzzer.

17. The apparatus of claim 13 wherein said acoustic sound generator comprises a speaker.

* * * * *